US010054942B2

(12) United States Patent
Ichikawa et al.

(10) Patent No.: US 10,054,942 B2
(45) Date of Patent: Aug. 21, 2018

(54) AUTONOMOUS DRIVING CONTROL DEVICE

(71) Applicant: TOYOTA JIDOSHA KABUSHIKI KAISHA, Toyota-shi, Aichi-ken (JP)

(72) Inventors: Kentaro Ichikawa, Shizuoka-ken (JP); Maiko Hirano, Susono (JP); Bunyo Okumura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/413,568

(22) Filed: Jan. 24, 2017

(65) Prior Publication Data

US 2017/0261981 A1   Sep. 14, 2017

(30) Foreign Application Priority Data

Mar. 8, 2016   (JP) ................................. 2016-044861

(51) Int. Cl.
G05D 1/00 (2006.01)
G05D 1/02 (2006.01)

(52) U.S. Cl.
CPC .......... G05D 1/0061 (2013.01); G05D 1/021 (2013.01)

(58) Field of Classification Search
CPC .................................................. G05D 1/0061
See application file for complete search history.

(56) References Cited

U.S. PATENT DOCUMENTS

| 8,260,482 | B1 | 9/2012 | Szybalski et al. |
| 8,670,891 | B1 | 3/2014 | Szybalski et al. |
| 9,073,576 | B2 * | 7/2015 | Lee ........................ B62D 1/286 |
| 2007/0288142 | A1 | 12/2007 | Maeda et al. |
| 2012/0046817 | A1 | 2/2012 | Kindo et al. |
| 2012/0296542 | A1 * | 11/2012 | Nitz .................... B60K 31/0008 |
| | | | 701/70 |
| 2014/0303827 | A1 * | 10/2014 | Dolgov ................. B60W 30/00 |
| | | | 701/23 |
| 2015/0120124 | A1 * | 4/2015 | Bartels .................. B60W 50/10 |
| | | | 701/23 |
| 2016/0280235 | A1 | 9/2016 | Sugaiwa et al. |

(Continued)

FOREIGN PATENT DOCUMENTS

| JP | H09-240502 A | 9/1997 |
| JP | 09-319999 A | 12/1997 |

(Continued)

Primary Examiner — Thomas G Black
Assistant Examiner — Sara J Lewandroski
(74) Attorney, Agent, or Firm — Sughrue Mion, PLLC

(57) ABSTRACT

An autonomous driving control device capable of starting an autonomous driving control without an operation of a driver and reducing a possibility that the driver can not start manual driving. An autonomous driving control is switched to manual driving when a determination section determines that the amount of operation by the driver is equal to or greater than a first threshold, before a predetermined time elapses since the autonomous driving control is automatically started. An autonomous driving control is switched to manual driving when the determination section determines that the amount of operation by the driver is equal to or greater than a second threshold that is greater than the first threshold, after the predetermined time elapses.

14 Claims, 3 Drawing Sheets

(56) References Cited

U.S. PATENT DOCUMENTS

| | | | |
|---|---|---|---|
| 2016/0280236 A1 | 9/2016 | Otsuka | |
| 2016/0325757 A1* | 11/2016 | Westlund | B60W 50/082 |
| 2016/0347327 A1* | 12/2016 | Kondo | B60W 50/14 |
| 2017/0029021 A1* | 2/2017 | Lee | B62D 5/0457 |
| 2017/0101080 A1* | 4/2017 | Brannstrom | B60W 50/08 |
| 2017/0203788 A1* | 7/2017 | Heo | B62D 15/021 |
| 2017/0220039 A1* | 8/2017 | Funakawa | G05D 1/0027 |
| 2017/0233004 A1* | 8/2017 | Hatano | G05D 1/021 |
| | | | 701/41 |
| 2017/0235305 A1* | 8/2017 | Jung | B60W 40/072 |
| | | | 701/23 |
| 2017/0235307 A1* | 8/2017 | Asakura | B60W 40/12 |
| | | | 701/23 |
| 2017/0247041 A1* | 8/2017 | Kim | B60W 50/082 |

FOREIGN PATENT DOCUMENTS

| | | |
|---|---|---|
| JP | 2001-317957 A | 11/2001 |
| JP | 2007-326453 A | 12/2007 |
| JP | 2010-264829 A | 11/2010 |
| JP | 2016-175613 A | 10/2016 |
| JP | 2016-175614 A | 10/2016 |
| WO | 2015/145606 A1 | 10/2015 |

\* cited by examiner

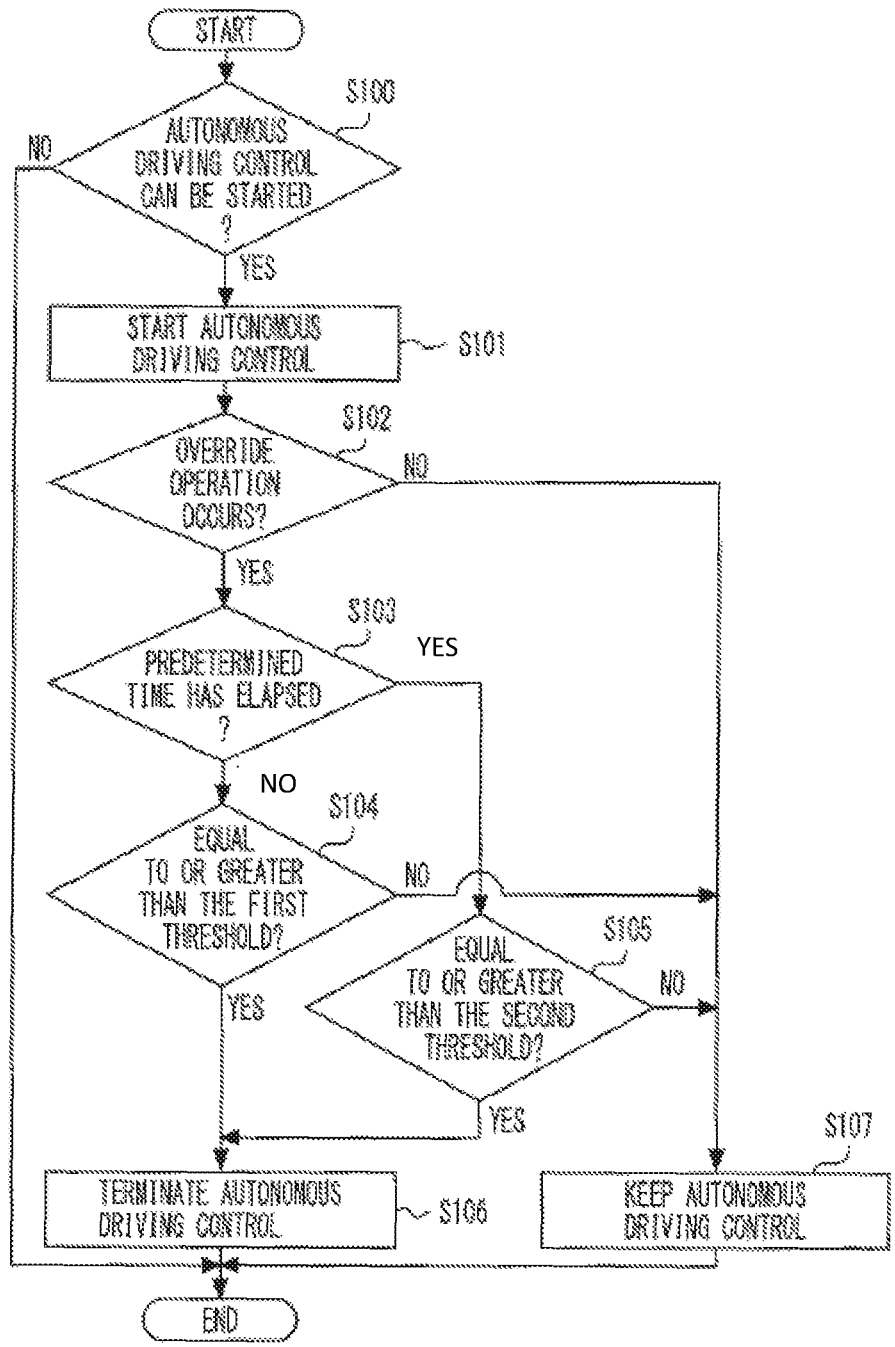

AUTONOMOUS DRIVING CONTROL DEVICE

BACKGROUND OF THE INVENTION

Field of the Invention

The present invention relates to an autonomous driving control device.

Background Art

There are known conventional autonomous driving control devices that perform an autonomous driving control. An example of such autonomous driving control devices is described in Patent Literature 1, for example.

According to the autonomous driving control method described in Claim 1 of Patent Literature 1, when a control computer determines that a vehicle is ready for an autonomous driving control, the control computer notifies a user (driver) that the vehicle is ready. Then, the autonomous driving control is started when the control computer receives a first input indicating that the user (driver) is ready.

Following is a patent literature which the applicant has noticed as a related art of the present invention.

[Patent Literature 1]: U.S. Pat. No. 8,670,891

Problem to be Solved by Embodiments of the Invention

As described above, in order to start the autonomous driving control, the autonomous driving control device described in Patent Literature 1 requires the first input that indicates the user (driver) is ready. Thus, with the autonomous driving control device described in Patent Literature 1, the user's (driver's) operation for starting the autonomous driving control is complicated.

Besides, if the autonomous driving control is automatically started when the driver is wishing to continue performing the manual driving, the driver wishes to switch from the autonomous driving control to the manual driving. In such a situation, if the switching from the autonomous driving control to the manual driving is difficult, the driver may be unable to perform the manual driving in spite of the driver wishing to perform the manual driving.

In view of the problem described above, an object of the embodiment of the present invention is to provide an autonomous driving control device that can autonomously engage in an autonomous driving control without the need for any operation of a driver to engage the autonomous driving control and at the same time can reduce the possibility that the driver is unable to perform a manual driving in spite of the driver wishing to perform the manual driving.

SUMMARY

In order to achieve the above described object, the first aspect of embodiments of the present invention is an autonomous driving control device that performs an autonomous driving control of a vehicle. The autonomous driving control device comprises:

a first determination section that determines whether or not the autonomous driving control can be automatically started;

a second determination section that deters whether or not to switch from the autonomous driving control to a manual driving; and an adjustment section that adjusts a threshold used in the determination made by the second determination section, wherein the autonomous driving control is automatically started when the first determination section determines that the autonomous driving control can be automatically started, before a predetermined time elapses since the autonomous driving control is automatically started, the threshold used in the determination made by the second determination section is adjusted to be a first threshold by the adjustment section, and switching from the autonomous driving control to the manual driving is performed when the second determination section determines that an amount of operation by a driver is equal to or greater than the first threshold, and after the predetermined time elapses since the autonomous driving control is automatically started, the threshold used in the determination made by the second determination section is adjusted to be a second threshold which is greater than the first threshold by the adjustment section, and switching from the autonomous driving control to the manual driving is performed when the second determination section determines that the amount of operation by the driver is equal to or greater than the second threshold.

That is, the autonomous driving control device according to the present invention can autonomously engage in an autonomous driving control of the vehicle. More specifically, the autonomous driving control device according to the present invention can start the autonomous driving control without the need for any operation by the driver to start the autonomous driving control.

Therefore, the autonomous driving control device according to the present invention can reduce the complexity of the operation by the driver to start the autonomous driving control and improve the ease of the operation to start the autonomous driving control, compared with the autonomous driving control device described in U.S. Pat. No. 8,670,891 that requires the first input indicating that the user (driver) is ready in order to engage in the autonomous driving control.

If the autonomous driving control is automatically started when the driver is wishing to continue performing the manual driving, the driver wishes to switch from the autonomous driving control to the manual driving. In such a situation, if the switching from the autonomous driving control to the manual driving is difficult, the driver may be undesirably unable to perform the manual driving in spite of the driver wishing to perform the manual driving.

In view of this, with the autonomous driving control device according to the present invention, before the predetermined time elapses since the autonomous driving control is automatically started, the autonomous driving control is switched to the manual driving when the amount of operation by the driver becomes equal to or greater than the first threshold that is smaller than the second threshold used after the predetermined time elapses.

That is, with the autonomous driving control device according to the present invention, before the predetermined time elapses since the autonomous driving control is automatically started, the driver can switch from the autonomous driving control to the manual driving with a smaller amount of operation than after the predetermined time elapses.

In other words, with the autonomous driving control device according to the present invention, the switching from the autonomous driving control to the manual driving is more easily performed before the predetermined time elapses since the autonomous driving control is automatically started than after the predetermined time elapses.

Therefore, with the autonomous driving control device according to the present invention, the driver can more readily, or more quickly, start the manual driving before the predetermined time elapses since the autonomous driving control is automatically started than after the predetermined time elapses.

As a result, the autonomous driving control device according to the present invention can reduce the possibility that the driver is unable to perform the manual driving in spite of the driver wishing to perform the manual driving.

The second aspect of embodiments of the present invention may further comprise a notification device that notifies the driver of the automatic start of the autonomous driving control.

That is, since the autonomous driving control device according to an embodiment of the present invention notifies the driver of the automatic start of the autonomous driving control, the autonomous driving control device can reduce the possibility that the driver fails to be aware that the autonomous driving control has been automatically started.

The third aspect of embodiments of the present invention may further comprise a notification device that provides the driver a notification as for the change of the threshold used in the second determination section, said change arises due to the adjustment by the adjustment section.

That is, with the autonomous driving control device according to an embodiment of the present invention, before the predetermined time elapses since the autonomous driving control is automatically started, the driver is notified that the threshold used in the determination as for switching from the autonomous driving control to the manual driving is smaller than the threshold used after the predetermined time elapses. Therefore, even if the autonomous driving control is automatically started despite the intention of the driver, the autonomous driving control device according to the embodiment of the present invention can assure the driver that the driver can readily switch from the autonomous driving control to the manual driving within the predetermined time.

The fourth aspect of embodiments of the present invention further comprises a monitor device that monitors a state of the driver, and the adjustment section changes the predetermined time based on the state of the driver monitored by the monitor device.

Specifically, with the autonomous driving control device according to the embodiment of the present invention, the predetermined time in which switching from the autonomous driving control to the manual driving is more easily performed is extended if the monitor device determines that the driver has not completed a preparation for engaging the manual driving, for example. On the other hand, the predetermined time in which switching from the autonomous driving control to the manual driving is more easily performed is shortened if the monitor device determines that the driver has no intention to perform the manual driving, for example.

Thus, compared with the case where the length of the predetermined time is not changed, the autonomous driving control device according to the embodiment of the present invention can reduce the possibility that switching from the autonomous driving control to the manual driving occurs despite the intention of the driver.

Advantages of Embodiments of the Present Invention

According to the present invention, the autonomous driving control can be started without the need for any operation by the driver to start the autonomous driving control, and the possibility that the driver is unable to perform the manual driving in spite of the driver wishing to perform the manual driving can be reduced.

BRIEF DESCRIPTION OF THE DRAWINGS

FIG. 3 is a flowchart for explaining procedures such as a judgment conducted by a judgement portion 16b of the autonomous driving control unit according to the first embodiment of the present invention.

DETAILED DESCRIPTION

Figure 1:
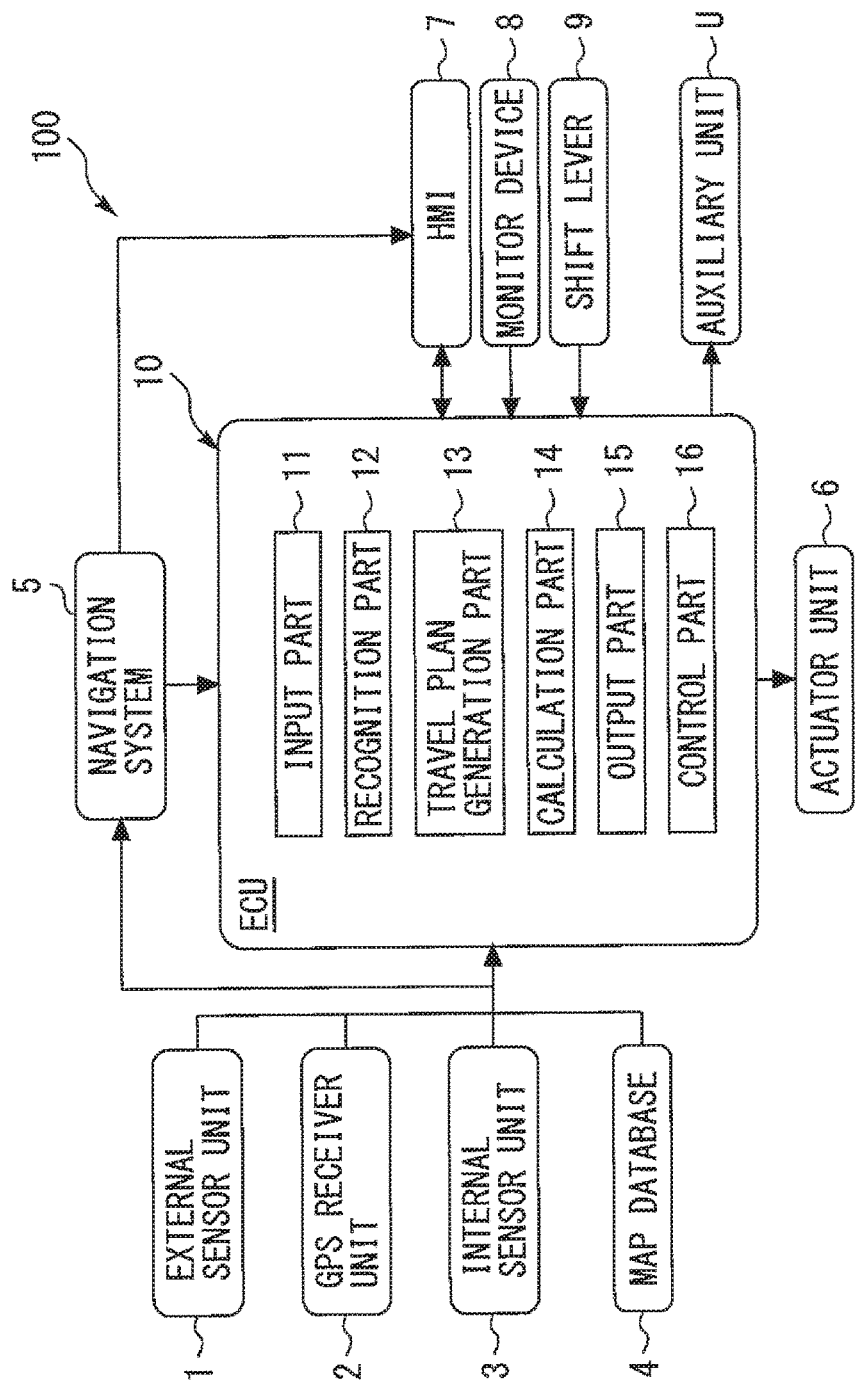
FIG. 1 is a schematic diagram for explaining the configuration of an autonomous driving control device according to a first embodiment of the present invention.

In the following, an autonomous driving control device according to a first embodiment of the present invention will be described. FIG. 1 is a schematic diagram showing a configuration of the autonomous driving control device according to the first embodiment.

In the example shown in FIG. 1, an autonomous driving control device 100 is mounted on a vehicle (not show), such as an automobile. The autonomous driving control device 100 performs an autonomous driving control for the vehicle. The term "autonomous driving control" means a control that does not require the driver of the vehicle to perform any driving operation, such as acceleration, deceleration and steering of the vehicle.

The autonomous driving control includes a lane keeping assist control, for example. According to the lane keeping assist control, steering wheels (not shown) are autonomously steered (that is, without the need for the driver to perform a steering operation) so that the vehicle is prevented from going oat from its traffic. That is, with the lane keeping assist control, the steering wheel is autonomously operated to keep the vehicle traveling within a traffic lane, even if the driver does not perform any steering operation.

The autonomous driving control includes a navigation control, for example. In the navigation control, if there is no other vehicle ahead of the vehicle, a constant speed control to keep the vehicle traveling at a preset constant speed occurs, and if there is another vehicle ahead of the vehicle, a follow-after control to adjust the speed of the vehicle in accordance with the distance from the other vehicle ahead of the vehicle.

In the example shown in FIG. 1, a comparison object is used. The comparison object is converted into a numerical value for comparison with a threshold. The threshold is used for determining whether the autonomous driving control should be switched to a manual driving. That is, the autonomous driving control device 100 switches from the autonomous driving control to the manual driving when the comparison object is equal to or greater than the threshold.

For example, the amount of steering, the amount of acceleration or the amount of braking operated by the driver during the autonomous driving control is used as the comparison object. The autonomous driving control device 100 switches from the autonomous driving control to the manual driving if any of the amounts of steering, acceleration and braking is equal to or greater than a threshold. It should be noted that the amount of steering includes a steering workload. The steering workload is described in detail in JP 2015-063244A.

The manual driving is a driving mode in which the vehicle travels based primarily on the driving operation by the driver, for example. The manual driving includes a driving mode in which the vehicle travels based only on the driving operation by the driver, for example. The manual driving also includes a driving mode in which the vehicle travels based primarily on the driving operation by the driver and secondarily on a driving operation assist control that assists the driving operation by the driver.

For example, the case in which the driving operation assist control is executed during the manual driving occurs when any of the steering operation, the accelerator operation and the brake operation are mainly done by the driver, and the autonomous driving control device 100 performs any of the steering operation, the accelerator operation and the brake operation which are not primarily done by the driver. Alternatively, the amount of manual operation by the driver, such as steering, accelerator or brake operation, may be adjusted by addition or subtraction of the amount of operation computed by the driving operation assist control.

In the example shown in FIG. 1, the autonomous driving control device 100 includes an external sensor unit 1, a global positioning system (GPS) receiver unit 2, an internal sensor unit 3, a map database 4, a navigation system 5, an actuator unit 6, a human machine interface (HMI) 7, a monitor device 8, a shift lever 9, an auxiliary unit U, and an electronic control unit (ECU) 10.

In the example shown in FIG. 1, the external sensor unit 1 serves as a detector that detects an external condition and provides peripheral information about the vehicle. The external sensor unit 1 includes at least one of a camera, a radar, and a LIDAR (Laser Imaging Detection And Ranging sensor).

The camera is an imaging device that images the external condition of the vehicle. The camera is mounted on the back side of a windshield of the vehicle, for example. The camera may be a monocular camera or a stereoscopic camera. The stereoscopic camera has two imaging parts disposed to reproduce a binocular parallax, for example. The imaging information obtained with the stereoscopic camera includes depth information. The camera outputs imaging information on the external condition of the vehicle to the ECU 10. The camera may be a visible light camera or an infrared camera.

The radar detects obstacles outside the vehicle using a radio wave. The radio wave is of a millimeter wave, for example. The radar transmits a radio wave around the vehicle and detects an obstacle by receiving the radio wave reflected from the obstacle. The radar can output the distance to the obstacle, the direction of the obstacle or the likes as obstacle information. The radar provides the information about the detected obstacle to the ECU 10. When a sensor fusion should be executed, the information about the received reflected radio wave may be provided to the ECU 10.

The LIDAR sensor detects an obstacle outside the vehicle while utilizing light. The LIDAR sensor emits light around the vehicle, then measuring the distance to the point of reflection and detecting an obstacle by receiving the light reflected from the obstacle. The LIDAR sensor can provide obstacle information, such as the distance to the obstacle or the direction of the obstacle. The LIDAR sensor outputs the information about the detected obstacle to the ECU 10. When sensor fusion should be executed, the information about the received reflected light may be provided to the ECU 10. The camera, the LIDAR sensor and the radar do not always have to be provided in combination.

In the example shown in FIG. 1, the GPS receiver unit 2 receives signals from three or more GPS satellites to provide positional formation about the position of the vehicle. The positional information includes the latitude and longitude, for example. The GPS receiver unit 2 outputs the positional information about the measured position of the vehicle to the ECU 10.

In other examples, the GPS receiver unit 2 may be replaced other means capable of determining, the latitude and longitude of the vehicle.

In the example shown in FIG. 1, the internal sensor unit 3 serves as a detector that provides information about the traveling condition of the vehicle and about the amount of any of the steering operation, the accelerator operation and the brake operation by the driver of the vehicle (the amounts of operation include the steering workload described above). In order to obtain the information about the traveling condition of the vehicle, the internal sensor unit 3 includes at least one of a speed sensor, an acceleration sensor unit and a yaw rate sensor. Further, in order to detect the amount of the operation, the internal sensor unit 3 includes at least one of a steering sensor, an accelerator pedal sensor and a brake pedal sensor.

The speed sensor is a detector that detects the speed of the vehicle. For example, the speed sensor is a wheel speed sensor that is mounted on a wheel of the vehicle or a drive shaft that rotates integrally with the wheel and detects the rotational speed of the wheel. The speed sensor outputs speed information (wheel speed information) including the speed of the vehicle to the ECU 10.

The acceleration sensor unit serves a detector that detects the acceleration of the vehicle. The acceleration sensor unit includes a longitudinal acceleration sensor that detects the acceleration of the vehicle in the longitudinal direction and a lateral acceleration sensor that detects the acceleration of the vehicle in the lateral direction, for example. The acceleration sensor unit outputs acceleration information including the acceleration of the vehicle to the ECU 10.

The yaw rate sensor is a detector that detects the yaw rate (rotational angular velocity) of the center of gravity of the vehicle around the vertical axis. For example, a gyro sensor is used as the yaw rate sensor. The yaw rate sensor outputs yaw rate information including the yaw rate of the vehicle to the ECU 10.

The steering sensor is a detector that detects the amount of operation of the steering wheel (the amount of steering operation) by the driver of the vehicle, for example. The amount of steering operation detected by the steering sensor is a steering angle of the steering wheel or a steering torque on the steering wheel, for example. The steering sensor is mounted on a steering shaft of the vehicle, for example. The steering sensor outputs information including the steering angle of the steering wheel or the steering torque on the steering wheel to the ECU 10.

The accelerator pedal sensor is a detector that detects the amount of depression the accelerator pedal, for example. The amount of depression of the accelerator pedal is indicated by the position of the accelerator pedal (pedal position) with respect to a predetermined position, for example. The predetermined position may be a fixed position or a position that varies with a predetermined parameter. The accelerator pedal sensor is mounted on a shaft part of the accelerator pedal of the vehicle, for example. The accelerator pedal sensor outputs operation information which accords with the amount of depression of the accelerator pedal to the ECU 10.

The brake pedal sensor is a detector that detects the amount of depression of the brake pedal, for example. The amount of depression of the brake pedal is indicated by the position of the brake pedal (pedal position) with respect to a predetermined position, for example. The predetermined position may be a fixed position or a position that varies with a predetermined parameter. The brake pedal sensor is mounted on a part of the brake pedal, for example. The brake pedal sensor may detect the operating force on the brake pedal (such as the force to depress the brake pedal or the pressure of the master cylinder). The brake pedal sensor outputs operation information which accords with the amount of depression of or the operating force on the brake pedal to the ECU 10.

In the example shown in FIG. 1, the map database 4 is a database that stores map information. The map database 4 is implemented in a hard disk drive (HDD) mounted on the vehicle, for example. The map information includes road location information, road shape information and positional information about intersections and branches, for example. The road shape information includes road types, such as curves or straight roads, or the curvature of curves, for example. The map information may further include an output signal of the external sensor unit 1, when the autonomous driving control device 100 uses positional information about obstructions, such as buildings and walls, or the simultaneous localization and mapping (SLAM) technology.

In other examples, the map database 4 may be stored in a computer at an infrastructure, such as an information processing center, that can communicate with the vehicle.

In the example shown in FIG. 1, the navigation system 5 is a device that guides the driver of the vehicle to a destination set on the map by the driver of the vehicle.

The navigation system 5 calculates a route along which the vehicle is to travel, based on the positional information about the vehicle obtained by the GPS receiver unit 2 and the map information in the map database 4. In the route, a lane within which the vehicle is to travel in a multilane section may be specified, for example. The navigation system 5 calculates a desired route from the current position of the vehicle to a destination, and notifies the driver of the desired route through an indication on a display or an audio output of a speaker, for example. The navigation system 5 outputs information about the desired route for the vehicle to the ECU 10, for example.

In the example shown in FIG. 1, the navigation system 5 uses the positional information about the vehicle obtained by the GPS receiver unit 2 and the map information in the map database 4. In other example, alternatively, the navigation system 5 may use information stored in a computer at an infrastructure, such as an information processing center, that can communicate with the vehicle. Alternatively, part of the processing performed by the navigation system 5 may be performed by the computer at the infrastructure.

In the example shown in FIG. 1, the actuator unit 6 is a device that controls a travelling of the vehicle. The actuator unit 6 includes at least a throttle actuator, a brake actuator and a steering actuator.

In the example shown in FIG. 1, the throttle actuator controls the amount of air supply to the engine (throttle opening) in response to a control signal from the ECU 10, thereby controlling the driving force of the vehicle.

In other examples where the vehicle is an electric vehicle, the actuator unit 6 does not include the throttle actuator but has a motor serving as a motive power source and receives a control signal for the motor from the ECU 10 to control the driving force of the vehicle.

The brake actuator controls a brake system in response to the control signal from the ECU 10, thereby controlling the braking force to be applied to the wheels of the vehicle. The brake system may be a hydraulic brake system, for example.

The steering actuator controls driving of an assistant motor, which controls the steering torque, of an electric power steering system in response to the control signal from the ECU 10. In this way, the steering actuator controls the steering torque of the vehicle.

In the example shown in FIG. 1, the HMI 7 is an interface for output and input of information between an occupant (including the driver) of the vehicle and the autonomous driving control device 100. The HMI 7 includes a display panel on which image information is shown to the occupant, a speaker for audio output, and a manipulation button or a touch panel with which the occupant can perform an input operation, for example. The HMI 7 may output information to the occupant through a personal digital assistant connected thereto by radio or receive an input operation by the occupant through the personal digital assistant.

In the example shown in FIG. 1, the monitor device 8 monitors the state of the driver. The monitor device 8 can check a manual driving preparation state of the driver. More specifically, the monitor device 8 can check whether or not the driver has completed a preparation to start the manual driving, for example. Alternatively, the monitor device 8 can also check whether or not the driver has an intention to perform the manual driving, for example.

The monitor device 8 may be a camera capable of imaging the driver, for example, which is used in estimation of the degree of eye opening or the direction of the line of sight of the driver, for example. Alternatively, the monitor device 8 may be a camera that images the hands of the driver, for example, which is used to determine by image analysis whether or not the driver is holding the steering wheel, for example. Alternatively, the monitor device 8 may be a touch sensor (distortion sensor) that detects the strength of the grip on the steering wheel, such as the touch sensor described in JP11-091397A, for example.

In the example shown in FIG. 1, the shift lever 9 is provided. As for the shift lever 9, there is provided a shift position for a mode in which the autonomous driving control can be automatically started.

In the example shown in FIG. 1, the auxiliary unit U is typically a device that can be operated by the driver of the vehicle. The auxiliary unit U is a generic term of devices that are not included in the actuator unit 6.

In the example shown in FIG. 1, the auxiliary unit U includes turn signals, headlamps, or wipers, for example.

In the example shown in FIG. 1, the ECU 10 performs the autonomous driving control of the vehicle. The ECU 10 has a central processing unit (CPU), a read only memory (ROM), and a random access memory (RAM), for example.

In the example shown in FIG. 1, the ECU 10 has an input part 11, a recognition part 12, a travel plan generation part 13, a calculation part 14, an output part 15, and a control part 16. The ECU 10 performs the controls of the above parts by executing a program loaded from the ROM into the RAM at the CPU. The ECU 10 may be composed of a plurality of electronic control units.

In the example shown in FIG. 1, the input part 11 acquires the amounts of steering operation, accelerator operation and brake operation by the driver of the vehicle during the autonomous driving control (the amounts of operation also include the steering workload described above) as well as the amounts of steering operation, accelerator operation and brake operation by the driver of the vehicle during the manual driving (the amounts of operation also include the steering workload described above), based on the information obtained by the internal sensor unit 3. The amounts of operation include the steering angle of the steering wheel, the steering torque on the steering wheel, the steering workload, the amount of depression of the accelerator pedal, the amount of depression of the brake pedal, and the operating force on the brake pedal, for example. Alternatively, the amounts of operation may include a duration of a state where the steering angle of the steering wheel, the steering torque on the steering wheel, the steering workload, the amount of depression of the accelerator pedal, the amount of depression of the brake pedal, the operating force on the brake pedal or the like is equal to or greater than a preset threshold.

In the example shown in FIG. 1, the recognition part 12 recognizes the environment surrounding the vehicle based on the information obtained by the external sensor unit 1 or the UPS receiver unit 2 or the information in the map database 4. The recognition part 12 has an obstacle recognition part (not shown), a road width recognition part (not shown), and an infrastructure recognition part (not shown), for example.

The obstacle recognition part recognizes obstacles around the vehicle as the environment surrounding the vehicle based on the information obtained by the external sensor unit 1. Obstacles recognized by the obstacle recognition part include a pedestrian, another vehicle, a moving object such as a motorcycle and a bicycle, a lane line (a white line or a yellow line), a curb, a guard rail, a pole and a median strip on a road, and a static object such as a building and a tree. The obstacle recognition part acquires information about the distance between the obstacle and the vehicle, the location of the obstacle, the direction, the relative speed and the relative acceleration of the obstacle with respect to the vehicle, and the type and the attribute of the obstacle. The types of the obstacle include a pedestrian, another vehicle, a moving object, a static object, and the like. The attribute of the object is a property of the obstacle, such as the hardness and the shape of the obstacle.

The road width recognition part recognizes the width of the road on which the vehicle is traveling as the environment surrounding the vehicle based on the information obtained by the external sensor unit 1 and the GPS receiver unit 2 as well as the information in the map database 4.

The infrastructure recognition part recognizes, as the environment surrounding the vehicle, whether or not the vehicle is traveling across an intersection or in a parking area based on the map information in the map database 4 and the positional information about the vehicle obtained by the GPS receiver unit 2. The infrastructure recognition part may recognize, as the environment surrounding the vehicle, whether or not the vehicle is traveling in a school zone, the vicinity of a childcare facility, the vicinity of a school, the vicinity of a park or the like based on the snap information and the positional information about the vehicle.

In the example shown in FIG. 1, the travel plan generation part 13 generates a travel plan for the vehicle based on the desired route calculated by the navigation system 5, the information about an obstacle around the vehicle recognized by the recognition part 12, and the map information in the map database 4.

The travel plan is a trajectory along which the vehicle is to move on the desired route. The travel plane includes the speed, the acceleration, the deceleration, the direction, the steering or the like of the vehicle at different points in time, for example.

The travel plan generation part 13 generates a travel plan that allows the vehicle to travel on the desired route by meeting safety, statutory and efficiency requirements. Furthermore, the travel plan generation part 13 generates the travel plan for the vehicle so as to avoid collision with an obstacle, based on the situation of obstacles around the vehicle.

In the example shown in FIG. 1, the calculation part 14 calculates a threshold used in the determination of whether or not to switch front the autonomous driving control to the manual driving, based on the amounts of operation (the amounts of operation may include the steering workload described above) by the driver of the vehicle during the autonomous driving control obtained by the input part 11.

For example, the ECU 10 stores a function of a threshold and the amounts of operation by the driver of the vehicle (the amount of operation may include the steering workload described above). The function is used to calculate the threshold used in the determination of whether or not to switch from the autonomous driving control to the manual driving by the calculation part 14.

In the example shown in FIG. 1, for example, the output part 15 displays the threshold used in the determination of whether or not to switch from the autonomous driving control to the manual driving calculated by the calculation part 14 on a display of the HMI 7.

Specifically, for example, the output part 15 displays the threshold used in the determination of whether or not to switch from the autonomous driving control to the manual driving during the autonomous driving control.

In the example shown in FIG. 1, the control part 16 automatically controls traveling of the vehicle based on the travel plan generated by the travel plan generation part 13. The control part 16 outputs a control signal based on the travel plan to the actuator unit 6. That is, the autonomous driving control of the vehicle is achieved by the control part 16 controlling the actuator unit 6 based on the travel plan.

During the autonomous driving control of the vehicle, the control part 16 switches from the autonomous driving control to the manual driving if an amount of operation by the driver obtained by the input part 11 (the amount of operation may include the steering workload described above) becomes equal to or greater than the threshold calculated by the calculation part 14.

Figure 2:
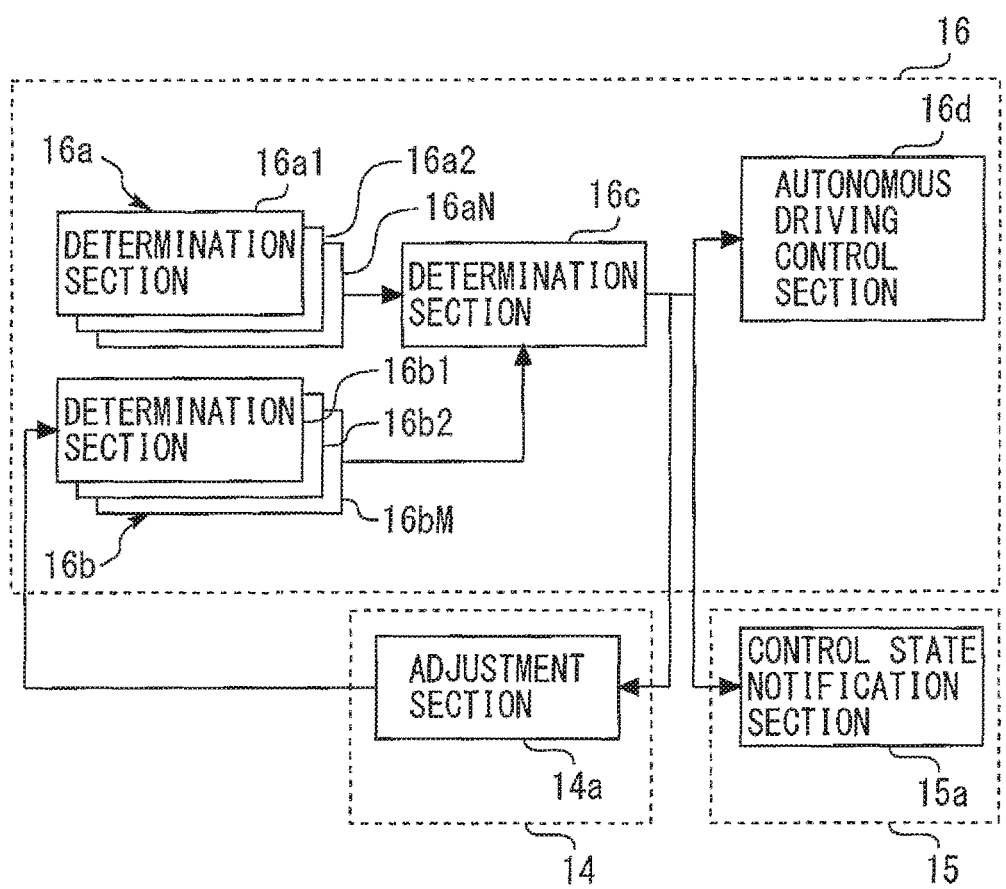
FIG. 2 is a diagram for explaining characteristic parts of the autonomous driving control device according to the first embodiment of the present invention.

FIG. 2 is a diagram for illustrating characteristic parts of the autonomous driving control device according to the first embodiment.

In the example shown in FIG. 2, the control part 16 (see FIGS. 1 and 2) has a determination section 16*a* that determines whether or not the autonomous driving control by the autonomous driving control device 100 can be automatically started. The determination section 16*a* is composed of N of determination sub-sections 16*a*1, 16*a*2, . . . and 16*a*N, for example. The determination section 16*a* makes the determination described below with regard to information other than the intention of the driver.

For example, the determination sub-section 16*a*1 determines whether or not the autonomous driving control can be automatically started, based on the difference between the position of the vehicle calculated based on the signal received by the GPS receiver unit 2 (see FIG. 1) and the actual position of the vehicle calculated based on the output signal from the external sensor unit 1 (see FIG. 1) and the map information in the map database 4 (see FIG. 1), for example.

For example, the determination sub-section 16a2 determines whether or not the autonomous driving control can be automatically started, based on the curvature of the road on which the vehicle traveling.

The determination section 16a determines that the autonomous driving control can be automatically started, if all of the N of determination sub-sections 16a1, 16a2, - - - and 16aN determine that the autonomous driving control can be automatically started.

In the example shown in FIG. 2, the determination section 16a functions as a first determination section that determines whether or not the autonomous driving control can be automatically started.

In the example shown in FIG. 2, the control part 16 (see FIGS. 1 and 2) has a determination section 16b that determines whether or not there is a trigger for terminating the autonomous driving control. The determination section 16b is composed of M of determination sub-sections 16b1, 16b2, . . . and 16bM, for example. The determination section 16b makes the determination described below when a certain operation is intentionally performed by the driver.

For example, the determination sub-section 16b1 determines whether or not switching from the autonomous driving control to the manual driving should be performed, based on the amount of steering operation (the amount of operation may include the steering workload described above) by the driver of the vehicle during the autonomous driving control obtained by the input part 11 (see FIG. 1).

For example, the determination sub-section 16b2 determines whether or not switching from the autonomous driving control to the manual driving should be performed, based on the amount of accelerator or brake operation by the driver of the vehicle during the autonomous driving control obtained by the input part 11.

The determination section 16b determines that switching from the autonomous driving control to the manual driving should be performed, if at least any one of the M of determination sub-sections 16b1, 16b2 . . . and 16bM determines that switching from the autonomous driving control to the manual driving should be performed.

In the example shown in FIG. 2, the determination section 16b functions as a second determination section that determines whether or not to switch from the autonomous driving control to the manual driving.

As described above, the determination sub-sections 16a1, 16a2, . . . 16aN and the determination sub-sections 16b1, 16b2, . . . 16bM have essentially different determination criteria.

In the example shown in FIG. 2, the control part 16 (see FIGS. 1 and 2) has a determination section 16c that makes a final determination of whether or not the autonomous driving control can be performed, and an autonomous driving control section 16d that performs the autonomous driving control.

The determination section 16c determines that the autonomous driving control can be automatically started, if all of the N of determination sub-sections 16a1, 16a2, . . . 16aN determine that the autonomous driving control can be automatically started.

If the determination section 16c determines that the autonomous driving control can be automatically started, the autonomous driving control section 16d autonomously engaged in the autonomous driving control.

On the other hand, if at least any one of the M of determination sub-sections 16b1, 16b2, . . . 16bM determines that switching from the autonomous driving control to the manual driving should be performed, the determination section 16c determines that switching from the autonomous driving control to the manual driving should be performed. Then, the autonomous driving control by the autonomous driving control section 16d is stopped, and the manual driving by the driver occurs. That is, a determination that switching from the autonomous driving control to the manual driving should be performed made by any of the M of determination sub-sections 16b1, 16b2, . . . 16bM serves as a trigger for terminating the autonomous driving control.

In the example shown in FIG. 2, the output part 15 (see FIGS. 1 and 2) has a control state notification section 15a that notifies the driver that the autonomous driving control is being performed, for example.

When the autonomous driving control is automatically started, the control state notification section 15a provides an indication that the autonomous driving control is being performed on the display of the HMI 7, for example.

When switching from the autonomous driving control to the manual driving is performed, the control state notification section 15a provides an indication that the autonomous driving control is not being performed (in other words, the manual driving is being performed) on the display of the HMI 7, pie.

In the example shown in FIG. 2, after the autonomous driving control is started, the determination section 16b determines whether or not switching from the autonomous driving control to the manual driving should be performed.

For example, the determination sub-section 16b1 determines whether or not switching from the autonomous driving control to the manual driving should be performed, based on the amount of steering operation (the amount of operation may include the steering workload described above) by the driver of the vehicle during the autonomous driving control obtained by the input part 11 (see FIG. 1).

For example, the determination sub-section 16b2 determines whether or not switching from the autonomous driving control to the manual driving should be performed, based on the amount of accelerator or brake operation by the driver of the vehicle during the autonomous driving control obtained by the input part 11.

That is, the determination section 16b determines whether or not switching from the autonomous driving control to the manual driving should be performed, based on the amount of operation (the amount of operation may include the steering workload described above) by the driver of the vehicle during the autonomous driving control obtained by the input part 11.

In the example shown in FIG. 2, the calculation part 14 (see FIGS. 1 and 2) has an adjustment section 14a that adjusts a threshold used in the determination section 16b for determining whether or not to switch from the autonomous driving control to the manual driving.

Specifically, the adjustment section 14a adjusts the threshold used in the determination section 16b for the above determination so that switching from the autonomous driving control to the manual driving is more easily performed before a predetermined time elapses since the autonomous driving control is automatically started than after the predetermined time elapses.

More specifically, the threshold used in the determination section 16b for the above determination is adjusted to be a first threshold by the adjustment section 14a before the predetermined time elapses since the autonomous driving control is automatically started. After the predetermined time elapses, the threshold used in the determination section 160 for the above determination is adjusted to be a second threshold greater than the first threshold by the adjustment section 14a.

The second threshold may be set as a fixed value in advance. Alternatively, the second threshold may not be set as a fixed vale but be set by a function of a state of a vehicle such as the speed of the vehicle, or a state of a driver such as the awareness of the driver. Alternatively, the second threshold may be set as a fixed value in advance and then be varied according to the state of the vehicle such as the speed of the vehicle, or the state of the driver such as the awareness of the driver. Specifically, the second threshold is used for determining whether or not there is an override. The second threshold is at least a value that is determined independently of the timing when the autonomous driving control is started or disstarted.

The second threshold is set so that there is an instant when the amount of operation (the amount of operation may include the steering workload described above) by the driver exceeds the second threshold while the manual driving by the driver is being performed.

The determination of whether to stop the autonomous driving control can be made not only based on the comparison between the amount of operation and the threshold such as the example described above but also based on whether a specific operation is done by the driver or not. For example, the determination can be made based on whether a turn signal operation is done or not.

In embodiments of the present invention, after the predetermined time elapses since the autonomous driving control is started, the determination section 16b does not determine that switching from the autonomous driving control to the manual driving even if the driver performs a turn signal operation. However, before the predetermined time elapses, the determination section 16b determines that switching from the autonomous driving control to the manual driving should be performed when the driver performs a turn signal operation. That is, in embodiments of the present invention, switching from the autonomous driving control to the manual driving is more easily performed before the predetermined time elapses.

FIG. 3 is a flowchart for illustrating processings including the determination made by the determination section 16b or the likes of the autonomous driving control device according to the first embodiment.

Once the routine shown in FIG. 3 as started, first, in Step S100, the determination sections 16a and 16e (see FIG. 2) determine whether or not the autonomous driving control can be automatically started. If the result of the determination is affirmative, the routine proceeds to Step S101. If the result of the determination is negative, the routine ends.

In Step S101, the autonomous driving control section 16d (see FIG. 2) automatically starts the autonomous driving control without the need for any operation by the driver.

In Step S102, the ECU 10 (see FIG. 1) then determines whether or not there is an operation by the driver (more specifically, an operation by the driver that interferes with the autonomous driving control), based on the amount of operation by the driver (the amount of operation may include the steering workload described above) detected by the internal sensor unit 3 (see FIG. 1), for example. If the result of the determination is affirmative, the routine proceeds to Step S103. If the result of the determination negative, the routine proceeds to Step S107.

In Step S103, for example, the ECU 10 determines whether or not a predetermined time has elapsed since the autonomous driving control is automatically started. If the result of the determination is affirmative, the routine proceeds to Step S104. If the result of the determination is negative, the routine proceeds to Step S105.

In Step S104, the determination section 16b (see FIG. 2) determines whether or not the amount of operation (the amount of operation may include the steering workload described above) is equal to or greater than the first threshold. If the result of the determination is affirmative, it is determined that the driver wishes to switch from the autonomous driving control to the manual driving, and the routine proceeds to Step S106. On the other hand, if the result of the determination is negative, it is determined that the driver wishes to keep the autonomous driving control, and the routine proceeds to Step S107.

In Step S105, the determination section 16b (see FIG. 2) determines whether or not the amount of operation (the amount of operation may include the steering workload described above) is equal to or greater than the second threshold. If the result of the determination is affirmative, it is determined that the driver wishes to switch from the autonomous driving control to the manual driving, and the routine proceeds to Step S106. On the other hand, if the result of the determination is negative, it is determined that the driver wishes to keep the autonomous driving control, and the routine proceeds to Step S107.

Specifically, in the example shown in FIG. 3, the first threshold in Step S104 is set at a smaller value than the second threshold in Step S105.

That is, in the example shown in FIG. 3, the adjustment section 14a (see FIG. 2) adjusts the thresholds used in the determination made by the determination section 16b (see FIG. 2) so that switching from the autonomous driving control to the manual driving is more easily performed (in other words, the result of the determination in Step S104 is more likely to be affirmative) before the predetermined time elapses since the autonomous driving control is automatically started than after the predetermined time elapses.

In the example shown in FIG. 3, the predetermined time is set to be 2 seconds, for example, and the first threshold is set to be one third of the second threshold, for example.

In Step S106, the autonomous driving control is terminated, and switching from the autonomous driving control to the manual driving is performed.

In Step S107, the autonomous driving control by the autonomous driving control section 16d (see FIG. 2) is maintained.

In an application of the autonomous driving control device according to the first embodiment, the autonomous driving control can be automatically started by the autonomous driving control section 16d (see FIG. 2) without the need for any operation by the driver. In addition, the autonomous driving control can also be started by an operation by the driver.

Specifically, for example, the ignition of the vehicle is first switched on, and the control part 16 then determines whether or not the autonomous driving control can be started, based on the environment surrounding the vehicle recognized by the external sensor unit 1 and the recognition part 12 of the ECU 10. If the autonomous driving control can be started, the control part 16 notifies the driver through the HMI 7 that the autonomous driving control can be started. When the driver then performs a predetermined input operation, the autonomous driving control device 100 starts the autonomous driving control.

In another application of the autonomous driving control device according to the first embodiment, the autonomous driving control device 100 may be configured so that the autonomous driving control cannot be started by any operation by the driver.

In the example shown in FIG. 3, the first threshold is fixed at a constant value until the predetermined time elapses since the autonomous driving control is automatically started. In another example, alternatively, the first threshold may be set to be a third of the second threshold, for example, at the point in time when the autonomous driving control is automatically started, and may be then gradually changed to be equal to the second threshold when the predetermined time elapses since the autonomous driving control is automatically started.

In other words, with the autonomous driving control device according to the first embodiment, the autonomous driving control of the vehicle can be automatically started by the autonomous driving control section 16d (see FIG. 2). That is, the autonomous driving control device according to the first embodiment can start the autonomous driving control without the need for any operation by the driver to start the autonomous driving control.

Therefore, compared with the case where an input that indicates that the driver is ready is required to start the autonomous driving control, the autonomous driving control device according to the first embodiment can reduce the complexity of the driver's operation to start the autonomous driving control and improve the ease of the operation to engage the autonomous driving control.

On the other hand, if the autonomous driving control is automatically started in spite of the driver wishing to perform the manual driving, the driver wishes to switch from the autonomous driving control to the manual driving. In such a situation, if the switching from the autonomous driving control to the manual driving is difficult to perform, the driver may be undesirably unable to perform the manual driving in spite of the driver wishing to perform the manual driving.

In view of this, with the autonomous driving control device according to the first embodiment, before the predetermined time elapses since the autonomous driving control is automatically started, switching from the autonomous driving control to the manual driving is performed in Step S106 (see FIG. 3) if it is determined in Step S104 (see FIG. 3) that the amount of operation (the amount of operation may include the steering workload described above) is equal to or greater than the first threshold which is smaller than the second threshold used after the predetermined time elapses.

That is, with the autonomous driving control device according to the first embodiment, the driver can switch from the autonomous driving control to the manual driving by a smaller amount of operation (the amount of operation may be the steering workload described above) before the predetermined time elapses since the autonomous driving control is automatically started than after the predetermined time elapses.

In other words, with the autonomous driving control device according to the first embodiment, switching from the autonomous driving control to the manual driving is more easily performed before the predetermined time elapses since the autonomous driving control is automatically started than after the predetermined time elapses.

Therefore, with the autonomous driving control device according to the first embodiment, the driver can more readily, or more quickly, engage in the manual driving before the predetermined time elapses since the autonomous driving control is automatically started than after the predetermined time elapses.

As a result, the autonomous driving control device according to the first embodiment can reduce the possibility that the driver is unable to perform the manual driving in spite of the driver wishing to perform the manual driving.

Furthermore, the autonomous driving control device according to the first embodiment includes the control state notification section 15a (see FIG. 2) that functions as a notification device that notifies the driver of the automatic start of the autonomous driving control. Therefore, the autonomous driving control device according to the first embodiment can reduce the possibility that the driver fails to be aware that the autonomous driving control has been automatically started.

It should be noted that the control state notification section 15a can be omitted in a second embodiment of the present invention.

In the first embodiment described above, the control state notification section 15a also serves as a notification device that notifies the driver that the thresholds used in the determinations in Steps S104 and S105 (see FIG. 3) made by the determination section 16b (see FIG. 2) are adjusted by the adjustment section 14a (see FIG. 2) so that they are different between before and after the predetermined time elapses.

That is, the autonomous driving control device according to the first embodiment notifies the driver, before the predetermined time elapses since the autonomous driving control is automatically started, that the threshold used in the determination of whether or not to switch from the autonomous driving control to the manual driving is smaller than the threshold used after the predetermined time elapses. Therefore, even if the autonomous driving control is automatically started despite the intention of the driver, the autonomous driving control device according to the first embodiment can assure the driver that the driver can readily switch from the autonomous driving control to the manual driving within the predetermined time.

Means for notifying that the threshold used before the predetermined time elapses and the threshold used after the predetermined time elapses are different may be a sound, an image indication, or a vibration of the steering wheel, for example.

In a third embodiment of the present invention, the control state notification section 15a that served as the above described notification device that notifies the driver of the variation of the thresholds can be omitted.

With the autonomous driving control device according to the first embodiment, the monitor device 8 (see FIG. 1) monitors the state of the driver. In accordance with the state of the driver monitored by the monitor device 8, the length of the predetermined time in Step S103 in FIG. 3 is changed by the adjustment section 14a (see FIG. 2).

More specifically, with the autonomous driving control device according to the first embodiment, the length of the predetermined time in which smaller threshold is used is increased if the monitor device 8 determines that the driver has not completed a preparation to engage in the manual driving, for example. On the other hand, the length of the predetermined time is reduced if the monitor device 8 determines that the driver has no intention to perform the manual driving, for example.

Thus, compared with the ease where the length of the predetermined time is fixed, the autonomous driving control device according to the first embodiment can reduce the possibility that switching from the autonomous driving control to the manual driving occurs despite the intention of the driver and the possibility that the autonomous driving control is maintained despite the intention of the driver.

In a fourth embodiment of the present invention, the monitor device 8 may be omitted, or the length of the predetermined time may be fixed.

Fifth embodiment of the present invention include the characteristics of the first to fourth embodiments of the present invention as required.

The invention claimed is:

1. An autonomous driving control device that performs an autonomous driving control of a vehicle, comprising:
an electronic control unit (ECU) configured to:
determine whether the autonomous driving control can be automatically started, wherein the autonomous driving control comprises at least any one of an acceleration, deceleration, or steering of the vehicle;
determine whether to switch from the autonomous driving control to a manual driving based upon whether an amount of operation by a driver is equal to or greater than a threshold; and
adjust the threshold that is used in the determination of whether to switch from the autonomous driving control to the manual driving,
wherein:
the autonomous driving control is automatically started when the ECU determines that the autonomous driving control can be automatically started,
after the autonomous driving control is automatically started and before a predetermined time elapses, the ECU adjusts the threshold to be a first threshold, and switches from the autonomous driving control to the manual driving when the ECU determines that the amount of operation by the driver is equal to or greater than the first threshold, and
after the predetermined time elapses since the autonomous driving control is automatically started, the ECU adjusts the threshold to be a second threshold which is greater than the first threshold, and switches from the autonomous driving control to the manual driving when amount of operation by the driver is equal to or greater than the second threshold.

2. The autonomous driving control device according to claim 1, further comprising a notification device that notifies the driver of the automatic start of the autonomous driving control.

3. The autonomous driving control device according to claim 1, further comprising a notification device that notifies the driver of the adjustment of the threshold that is used in the determination of whether to switch from the autonomous driving control to the manual driving.

4. The autonomous driving control device according to claim 1, further comprising a monitor device that monitors a state of the driver,
wherein the ECU is further configured to change the predetermined time based on the state of the driver monitored by the monitor device.

5. The autonomous driving control device according to claim 1, wherein the ECU is further configured to generate a travel plan for the vehicle based on at least any one of positional information, map information, or recognized information, and control the vehicle in the autonomous mode based on the generated travel plan.

6. The autonomous driving control device according to claim 1, wherein the ECU is further configured to:
receive a GPS signal indicating a position of the vehicle from a GPS receiver on the vehicle;
receive a peripheral information from an on-board sensor, which detects an external condition of the vehicle; and
determine whether the autonomous driving control system is able to control the vehicle in the autonomous mode based on a difference between a position of the vehicle calculated based on the GPS signal and a position calculated based on the peripheral information.

7. The autonomous driving control device according to claim 1, wherein the ECU is further configured to:
acquire a curvature of the road on which the vehicle is traveling, and
determine whether the autonomous driving control system is able to control the vehicle in the autonomous mode based on the curvature.

8. The autonomous driving control device according to claim 7, wherein the curvature is acquired based on map information in a map database and a position of the vehicle.

9. The autonomous driving control device according to claim 8, wherein
the position of the vehicle is calculated based on at least one of a GPS signal provided by a GPS receiver on the vehicle and a peripheral information provided by an on-board sensor, which detects an external condition of the vehicle.

10. A method comprising:
determining, by an electronic control unit (ECU), whether an autonomous driving control system on a vehicle is able to control the vehicle in an autonomous mode;
controlling, without a first input by a driver for requesting to start the autonomous mode, the vehicle in the autonomous mode when the ECU determines the autonomous driving control system is able to control the vehicle in the autonomous mode, wherein
the autonomous driving control system is configured to:
receive the first input via a human machine interface (HMI), which includes at least one of a display panel, a switching button, a sound speaker and a mobile device;
receive a second input by the driver, said second input including at least one input generated by a steering wheel, a brake pedal, or an acceleration pedal;
determine whether a time period, from a time when the autonomous driving mode is engaged until a time when the second input is received, is equal to or greater than a first threshold time period;
determine an override-threshold so that the override-threshold is set as a first threshold if the time period is less than the first threshold time period and is set as a second threshold which is greater than the first threshold if the time period is greater than the first threshold time period; and
switch from the autonomous driving mode to a manual driving mode if the second input is equal to or greater than the override-threshold.

11. The method according to claim 10, further comprising:
receiving, by the ECU, a GPS signal indicating a position of the vehicle from a GPS receiver on the vehicle;
receiving, by the ECU, a peripheral information from an on-board sensor, which detects an external condition of the vehicle; and
determining, by the ECU, whether the autonomous driving control system is able to control the vehicle in the autonomous mode based on a difference between a position of the vehicle calculated based on the GPS signal and a position calculated based on the peripheral information.

12. The method according to claim 10, further comprising:

acquiring a curvature of the road on which the vehicle is traveling, and determining whether the autonomous driving control system is able to control the vehicle in the autonomous mode based on the curvature.

13. The method according to claim 12, wherein the curvature is acquired based on map information in a map database and a position of the vehicle.

14. The method according to claim 13, wherein the position of the vehicle is calculated based on at least one of a GPS signal provided by a GPS receiver on the vehicle and a peripheral information provided by an on-board sensor, which detects an external condition of the vehicle.

* * * * *